United States Patent
Ko et al.

(10) Patent No.: US 10,817,113 B2
(45) Date of Patent: *Oct. 27, 2020

(54) TOUCH APPARATUS

(71) Applicant: Acer Incorporated, New Taipei (TW)

(72) Inventors: Chueh-Pin Ko, New Taipei (TW); Chih-Chiang Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/362,713

(22) Filed: Mar. 25, 2019

(65) Prior Publication Data

US 2019/0220144 A1 Jul. 18, 2019

Related U.S. Application Data

(63) Continuation of application No. 15/587,203, filed on May 4, 2017, now Pat. No. 10,318,073.

(30) Foreign Application Priority Data

Feb. 14, 2017 (TW) .............................. 106104710 A (51) Int. Cl.
G06F 3/041 (2006.01)
G06F 3/044 (2006.01)
G06F 3/0354 (2013.01)

(52) U.S. Cl.
CPC ........ *G06F 3/0418* (2013.01); *G06F 3/03545* (2013.01); *G06F 3/044* (2013.01); *G06F 3/0412* (2013.01); *G06F 2203/04106* (2013.01)

(58) Field of Classification Search
CPC .. G06F 1/3262; G06F 3/0354; G06F 3/03545; G06F 3/041; G06F 3/0412;
(Continued)

(56) References Cited

U.S. PATENT DOCUMENTS 6,504,530 B1 * 1/2003 Wilson ................. G06F 3/0418
345/173
9,357,493 B1 * 5/2016 Butler ............... H04W 52/0254
(Continued)

FOREIGN PATENT DOCUMENTS

CN 102419487 4/2012
CN 203025679 6/2013
(Continued)

OTHER PUBLICATIONS

"Office Action of Europe Counterpart Application", dated Apr. 21, 2020, p. 1-9.

*Primary Examiner* — Michael J Eurice
(74) *Attorney, Agent, or Firm* — JCIPRNET (57) ABSTRACT

A touch apparatus includes a plurality of first sensing electrodes, a plurality of second sensing electrodes, and a plurality of third sensing electrodes. The first sensing electrodes extend along a first direction. The second sensing electrodes are electrically isolated from the first sensing electrodes, and extend along a second direction. The plurality of third sensing electrodes are electrically isolated from the second sensing electrodes, and extend along the first direction. At least some of the first sensing electrodes, at least some of the second sensing electrodes, and at least some of the third sensing electrodes are formed at different film layers respectively.

17 Claims, 10 Drawing Sheets

(58) Field of Classification Search
CPC ...... G06F 3/0416; G06F 3/0418; G06F 3/044; G06F 2203/04103; G06F 2203/04104; G06F 2203/04106; G06F 2203/04108; G06F 2203/04111

See application file for complete search history.

(56) References Cited

U.S. PATENT DOCUMENTS

| | | | |
|---|---|---|---|
| 10,386,957 B2* | 8/2019 | Nakamura | G06F 3/0416 |
| 2002/0054261 A1* | 5/2002 | Sekiguchi | G02F 1/13338 |
| | | | 349/122 |
| 2003/0067451 A1* | 4/2003 | Tagg | G01V 3/088 |
| | | | 345/174 |
| 2008/0062148 A1* | 3/2008 | Hotelling | G02F 1/13338 |
| | | | 345/174 |
| 2009/0256821 A1* | 10/2009 | Mamba | G06F 3/044 |
| | | | 345/174 |
| 2009/0284492 A1* | 11/2009 | Chino | G06F 3/0412 |
| | | | 345/174 |
| 2010/0020032 A1* | 1/2010 | Mamba | G06F 3/044 |
| | | | 345/173 |
| 2010/0134440 A1* | 6/2010 | Hayakawa | G06F 3/044 |
| | | | 345/174 |
| 2010/0292945 A1* | 11/2010 | Reynolds | G01R 27/2605 |
| | | | 702/65 |
| 2012/0075221 A1* | 3/2012 | Yasuda | B32B 37/02 |
| | | | 345/173 |
| 2014/0043283 A1* | 2/2014 | Kim | G06F 3/0416 |
| | | | 345/174 |
| 2014/0139481 A1* | 5/2014 | Han | G06F 3/044 |
| | | | 345/174 |
| 2015/0268795 A1* | 9/2015 | Kurasawa | G06F 3/0418 |
| | | | 345/174 |
| 2016/0139733 A1 | 5/2016 | Noguchi et al. | |
| 2017/0154704 A1* | 6/2017 | Kanna | C09D 129/04 |
| 2017/0199599 A1* | 7/2017 | Takahashi | G06F 3/044 |
| 2017/0205913 A1* | 7/2017 | Kimura | G06F 3/0416 |
| 2017/0228052 A1* | 8/2017 | Nakamura | G06F 3/03545 |
| 2017/0228090 A1* | 8/2017 | Nakamura | G06F 3/03545 |

FOREIGN PATENT DOCUMENTS

| | | | |
|---|---|---|---|
| CN | 103941933 | 7/2014 | |
| CN | 104281306 | 1/2015 | |
| CN | 104965623 | 10/2015 | |
| CN | 105975109 | 9/2016 | |
| JP | 2017010384 A * | 1/2017 | ........... G06F 3/0445 |
| WO | 2016149447 | 9/2016 | |
| WO | 2016208347 | 12/2016 | |

* cited by examiner

TOUCH APPARATUS

CROSS-REFERENCE TO RELATED APPLICATION

This application is a continuation application of and claims the priority benefit of U.S. application Ser. No. 15/587,203, filed on May 4, 2017. This prior application claims the priority benefit of Taiwan application serial no. 106104710, filed on Feb. 14, 2017. The entirety of each of the above-mentioned patent application is hereby incorporated by reference herein and made a part of this specification.

BACKGROUND OF THE INVENTION

1. Field of the Invention

The present invention relates an electronic apparatus, and particular to a touch apparatus.

2. Description of Related Art

A touch apparatus plays an important role no matter in a mobile phone, a tablet computer, or a notebook computer. Gradually, use of the touch apparatus is updated from touching by a finger to an active stylus. The active stylus includes a lot of technologies, and mainly may be divided into electromagnet-type and capacitive technologies. A capacitive stylus needs an independent electromagnetic induction plate, and is unique because of enabling, through electromagnetic induction, the stylus to actively transmit a signal, having good performances for a long time. The capacitive stylus implements an electric field output by pre-loading a voltage by a pen point, and calculates, according to an electric field during a reception period of a sensing end, a touch position of the pen point which is above a touch panel. A greatest advantage of the capacitive stylus is including no independent induction plate, but sensing the finger and an active stylus by using an existing touch panel, and therefore has an advantage in cost. However, the finger and the active stylus share two sets of sensing electrodes, so that efficiencies for sensing the finger and the active stylus cannot be improved.

SUMMARY OF THE INVENTION

The present invention provides a touch apparatus having a good efficiency.

The touch apparatus of the present invention includes a plurality of first sensing electrodes, a plurality of second sensing electrodes, and a plurality of third sensing electrodes. The first sensing electrodes extend along a first direction. The second sensing electrodes are electrically isolated from the first sensing electrodes, and extend along a second direction different from the first direction. The plurality of third sensing electrodes are electrically isolated from the second sensing electrodes, and extend along the first direction. At least some of the first sensing electrodes, at least some of the second sensing electrodes, and at least some of the third sensing electrodes are formed at different film layers respectively.

Based on the above, the touch apparatus according to an embodiment of the present invention, efficiency for sensing a finger and/or a stylus can be improved by using the third sensing electrodes outside the first sensing electrodes and the second sensing electrodes.

In order to make the aforementioned features and advantages of the present invention more comprehensible, embodiments accompanied with figures are described in detail below.

DESCRIPTION OF THE EMBODIMENTS

Herein, examples of exemplary embodiments are described in the figures with reference to the exemplary embodiments of the present invention in detail. As possible, same component symbols in the figures and the description are used to represent the same or similar parts.

Figure 1:
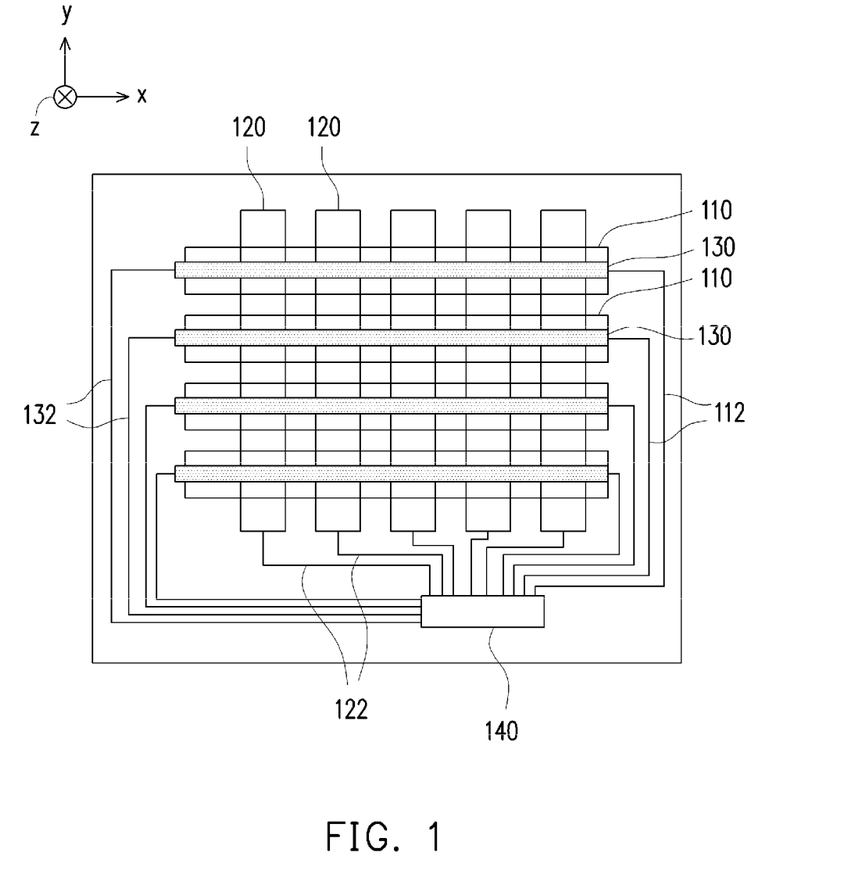
FIG. 1 is a schematic top view of a touch apparatus according to an embodiment of the present invention.

FIG. 1 is a schematic top view of a touch apparatus according to an embodiment of the present invention. Please refer to FIG. 1. A touch apparatus 100 includes a plurality of first sensing electrodes 110 extending along a first direction x, a plurality of second sensing electrodes 120 extending along a second direction y, and a plurality of third sensing electrodes 130 extending along the first direction x. The first sensing electrodes 110 and the second sensing electrodes 120 are electrically isolated. The third sensing electrodes 130 and the second sensing electrodes 120 are electrically isolated. At least some of the first sensing electrodes 110, at least some of the second sensing electrodes 120, and at least some of the third sensing electrodes 130 are formed at different film layers respectively.

Please refer to FIG. 1. The touch apparatus 100 further includes a control unit 140. The first sensing electrodes 110, the second sensing electrodes 120, and the third sensing electrodes 130 are electrically connected to the control unit 140. In the present embodiment, the touch apparatus 100 further includes a plurality of first cables 112, a plurality of second cables 122, and a plurality of third cables 132. The first sensing electrodes 110 may be electrically connected to the control unit 140 through the first cables 112. The second sensing electrodes 120 may be electrically connected to the control unit 140 through the second cables 122. The third sensing electrodes 130 may be electrically connected to the control unit 140 through the third cables 132. The control unit 140, for example, is an integrated circuit (integrated circuit, IC) including a plurality of pins, but the present invention is not limited thereto. In the present embodiment, the plurality of first cables 112, the plurality of second cables 122, and the plurality of third cables 132 may be separated from each other and be connected to the plurality of pins of the control unit 140 respectively. However, the present invention is not limited thereto. In another embodiment, each of third cables 132 and a corresponding first cable 112 may also be connected together before extending to the control unit 140, so that the control unit 140 needs not to add quantity of the pins because the third sensing electrodes 130 are provided.

The touch apparatus 100 may determine a touch position of a finger of a user according to signals on the first sensing electrodes 110 and the second sensing electrodes 120. The touch apparatus 100 may also determine a touch position of a stylus according to signals on the second sensing electrodes 120 and the third sensing electrodes 130. It should be noted that, because configurations of the third sensing electrodes 130, the efficiency of the touch apparatus 100 for sensing the finger and/or the stylus can be improved, being described in examples below by using FIG. 1, FIG. 2, and FIG. 3.

Figure 2:
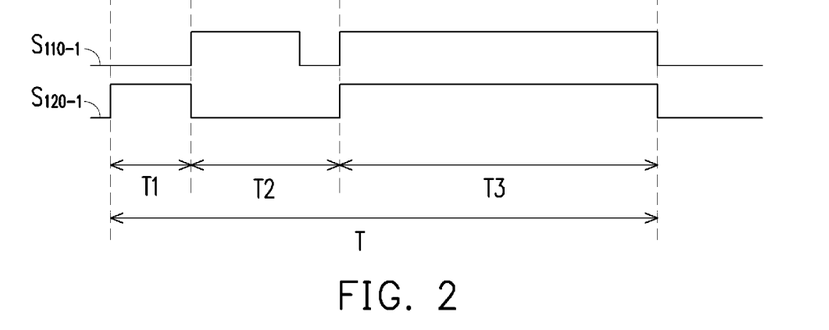
FIG. 2 is a schematic diagram of a signal on a first sensing electrode and a signal on a second sensing electrode according to a comparative embodiment.

A touch apparatus in the comparative embodiment includes the first sensing electrodes 110 and the second sensing electrodes 120 of the touch apparatus 100, but does not include the third sensing electrodes 130 of the touch apparatus 100. FIG. 2 is a schematic diagram of a signal $S_{110}$ on a first sensing electrode 110 and a signal $S_{120}$ on a second sensing electrode 120 of the touch apparatus according to a comparative embodiment. Please refer to FIG. 2. The touch apparatus according to the comparative embodiment senses the finger and the stylus within a frame time T, where the stylus may send a signal. The frame time T includes a first subframe time T1, a second subframe time T2 successive to the first subframe time T1, and a third subframe time T3 successive to the second subframe time T2. A control unit of the touch apparatus according to the comparative embodiment respectively reads, at the first subframe time T1 and the second subframe time T2, the signal $S_{110}$ on the first sensing electrode 110 and the signal $S_{120\text{-}1}$ on the second sensing electrode 120, so as to determine a touch position of a stylus. Within the third subframe time T3, the control unit of the touch apparatus according to the comparative embodiment drives the plurality of first sensing electrodes 110 (i.e., the control unit inputs the signal $S_{110}$ to the first sensing electrodes 110) and reads the signal $S_{120}$ on the second sensing electrode 120, so as to determine a touch position of a finger. In the comparative embodiment, a processing time of the stylus is, for example, 3.6 ms, a processing time of the finger is, for example, 3.9 ms, a frame time for sensing the finger and the stylus for one time is, for example, 7.5 ms, and a report rate is, for example, 133 Hz.

Figure 3:
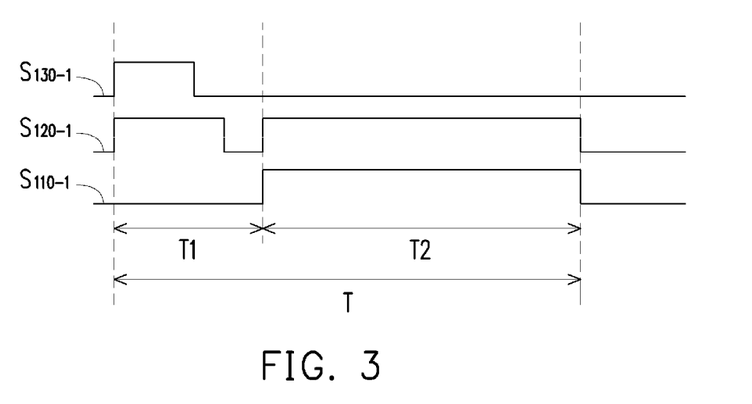
FIG. 3 is a schematic diagram of a signal on a first sensing electrode, a signal on a second sensing electrode, and a signal on a third sensing electrode according to an embodiment of the present invention.

FIG. 3 is a schematic diagram of a signal $S_{110\text{-}1}$ on a first sensing electrode 110, a signal $S_{120\text{-}1}$ on a second sensing electrode 120, and a signal $S_{130\text{-}1}$ on a third sensing electrode 130 according to an embodiment of the present invention. Please refer to FIG. 1 and FIG. 2. The touch apparatus 100 senses the finger and the stylus within the frame time T, where the stylus may send a signal. The frame time T includes a first subframe time T1, and a second subframe time T2 successive to the first subframe time T1. Within the first subframe time T1, the control unit 140 reads the signal $S_{120\text{-}1}$ on the second sensing electrode 120 and the signal $S_{130\text{-}1}$ on the third sensing electrode 130 at the same time, so as to determine the touch position of the stylus. Within the second subframe time T2, the control unit 140 drives the plurality of first sensing electrodes 110 (i.e., the control unit 140 inputs the signal $S_{110\text{-}1}$ to the first sensing electrodes 110) and reads the signal $S_{120\text{-}1}$ on the second sensing electrode 120, so as to determine the touch position of the finger. It should be noted that because of the configuration of the third sensing electrode 130, when the touch apparatus 100 sense the stylus, the control unit 140 needs not to respectively read the signals on two sets of sensing electrodes at different periods of time (for example, the first subframe time T1 and the second subframe time T2 in FIG. 2), but may read the signal $S_{120\text{-}1}$ on the second sensing electrode 120 and the signal $S_{130\text{-}1}$ on the third sensing electrode 130 at the same time. In this way, the processing time of the stylus may be shortened, thereby improving the efficiency of the touch apparatus 100 for sensing the finger and/or the stylus. For example, compared with the touch apparatus according to the comparative embodiment, in the present embodiment, the processing time of the stylus may be shortened to 2.3 ms, the frame time for sensing the finger and the stylus for one time may be shortened from 7.5 ms to 6.2 ms, and the report rate may substantially be improved from 133 Hz to 160 Hz, but the present invention is not limited thereto.

Figure 4:
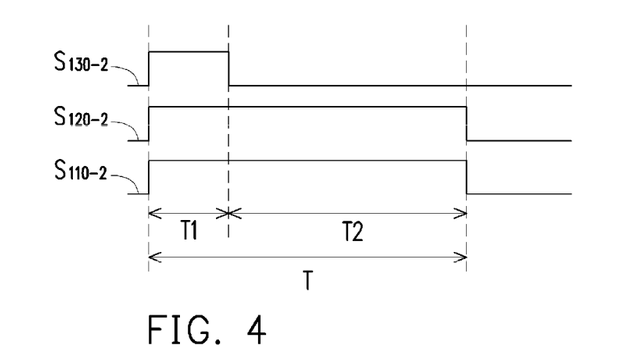
FIG. 4 is a schematic diagram of a signal on a first sensing electrode, a signal on a second sensing electrode, and a signal on a third sensing electrode according to another embodiment of the present invention.

FIG. 4 is a schematic diagram of a signal $S_{110\text{-}2}$ on a first sensing electrode 110, a signal $S_{120\text{-}2}$ on a second sensing electrode 120, and a signal $S_{130\text{-}2}$ on a third sensing electrode 130 according to another embodiment of the present invention. Please refer to FIG. 1 and FIG. 4. The touch apparatus 100 senses the finger and the stylus within the frame time T, where the stylus may send a signal. The frame time T includes a first subframe time T1, and a second subframe time T2 successive to the first subframe time T1. Within the first subframe time T1, the control unit 140 reads the signal $S_{120\text{-}2}$ on the second sensing electrode 120 and the signal $S_{130\text{-}2}$ on the third sensing electrode 130 at the same time, so as to determine the touch position of the stylus. Particularly, within the first subframe time T1 and the second subframe time T2, the control unit 140 drives the first sensing electrode 110 (i.e., the control unit 140 inputs the signal $S_{110\text{-}2}$ to the first sensing electrodes 110) and reads the signal $S_{120\text{-}2}$ on the second sensing electrode 120, so as to determine the touch position of the finger. It should be noted that because of the configuration of the third sensing electrode 130, the touch apparatus 100 may perform, within a period of time of sensing the finger, a part of an action of sensing the stylus. In this way, the report rate may be shortened, thereby improving the efficiency of the touch apparatus 100 for sensing the finger and/or the stylus. For example, in the present embodiment, the frame time for sensing the finger and the stylus for one time may be shortened from 7.5 ms to 3.9 ms, and the report rate may substantially be improved from 133 Hz to 260 Hz, but the present invention is not limited thereto.

The third sensing electrode 130 is configured to sense a touch position of the third sensing electrode 130, and is also configured to sense an orientation of the stylus. The orientation of the stylus includes a distance from the stylus suspended outside the touch apparatus 100 to a touch surface of the touch apparatus 100, and may include a free movement, rotation, and incline within the orientation of the stylus in a three-dimensional space such as a degree of inclination of the stylus. The degree of inclination of the stylus refers to a size of an included angle between the touch surface of the touch apparatus (for example: an upper surface of a protection element 150 or an upper surface of a second substrate 220 of a display module LCM in the subsequent paragraphs) and a length direction of the stylus. How to sense the distance from the stylus suspended outside the touch apparatus 100 to the touch surface of the touch apparatus 100 and the degree of inclination of the stylus is described below in examples with reference to FIG. 5.

Figure 5:
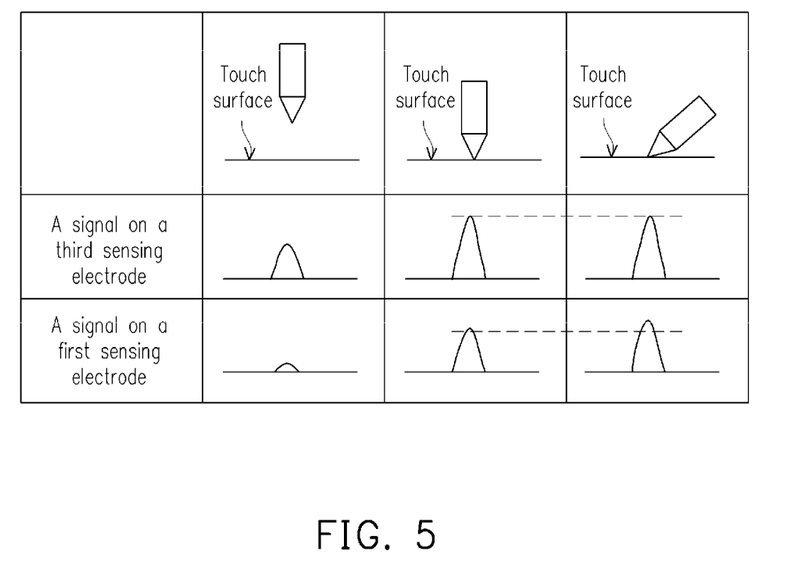
FIG. 5 shows signals on a first sensing electrode and on a second sensing electrode of a touch apparatus according to an embodiment of the present invention.

FIG. 5 shows signals on a first sensing electrode and on a second sensing electrode of a touch apparatus according to an embodiment of the present invention. Please refer to FIG. 1 and FIG. 5. As shown in the second line of FIG. 5, when the stylus is suspended outside the touch apparatus 100 (i.e., the stylus does not touch the touch surface), a distance from the stylus to the third sensing electrode 130 is far, a capacitance between the stylus and the third sensing electrode 130 is small, and the signal on the third sensing electrode 130 is small. As shown in the third line of FIG. 5, when the stylus touches the touch surface of the touch apparatus 100, the distance from the stylus to the third sensing electrode 130 is close, the capacitance between the stylus and the third sensing electrode 130 is large, and the signal on the third sensing electrode 130 is great. According to a size of the signal on the third sensing electrode 130, it may be determined that whether the stylus is suspended outside the touch apparatus 100. For example, when the stylus touches the touch surface of the touch apparatus 100, the signal on the third sensing electrode 130 is a standard signal; and if the signal on the third sensing electrode 130 is smaller than the standard signal, it may be determined that whether the stylus is suspended outside the touch apparatus 100. Further, according to a difference between the signal on the third sensing electrode 130 and the standard signal, the distance from the stylus suspended outside the touch apparatus 100 to the touch surface of the touch apparatus 100 may further be determined.

In addition, please refer to FIG. 1 and FIG. 5. As shown in the third line of FIG. 5, the control unit 140 may read the signal on the first sensing electrode 110 (i.e., the first sensing electrode 110 receives a signal sent by the stylus) and the signal on the third sensing electrode 130 (the third sensing electrode 130 receives the signal sent by the stylus) at the same time, so as to obtain a first signal difference. As shown in the fourth line of FIG. 5, at a second time point different from a first time point, the control unit 140 may read the signal on the first sensing electrode 110 and the signal on the third sensing electrode 130 at the same time, so as to obtain a second signal difference. The control unit 140 compares the first signal difference and the second signal difference, so as to determine the degree of inclination of the stylus. For example, as shown in the third line of FIG. 5, the degree of inclination of the stylus is low (for example: being nearly not inclined). At this time, a difference between the signal on the first sensing electrode 110 and the signal on the third sensing electrode 130 is the first signal difference. As shown in the fourth line of FIG. 5, the difference between the signal on the first sensing electrode 110 and the signal on the third sensing electrode 130 is the second signal difference. If the second signal difference is smaller than the first signal difference, the inclination of the stylus may be determined. Further, in a case in which the second signal difference is smaller than the first signal difference, the smaller second signal difference indicates a greater degree of inclination of the stylus.

Figure 6:
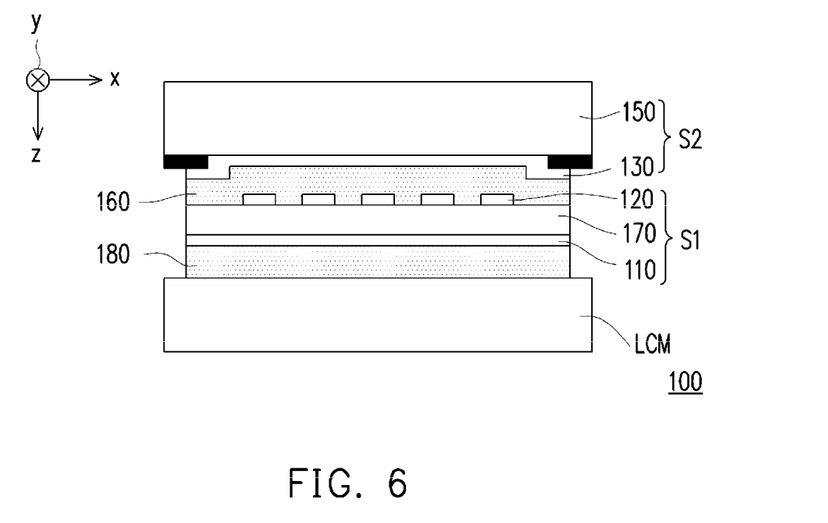
FIG. 6 is a cross-sectional schematic view of a touch apparatus according to an embodiment of the present invention.

FIG. 6 is a cross-sectional schematic view of a touch apparatus according to an embodiment of the present invention. Please refer to FIG. 1 and FIG. 6. In the present embodiment, the first sensing electrode 110 may be a transmission electrode (Transmission; Tx), and the second sensing electrode 120 may be a reception electrode (Reception; Rx). The third sensing electrode 130, the second sensing electrode 120, and the first sensing electrode 110 may be selectively and sequentially arranged along a line-of-sight direction z, where the line-of-sight direction z is vertical to an extension direction of the first sensing electrode 110 (i.e., the first direction x) and an extension direction of the second sensing electrode 120 (i.e., the second direction y). However, the present invention is not limited thereto. Both the first sensing electrode 110 and the second sensing electrode 120 may sense the finger, and the second sensing electrode 120 and the third sensing electrode 130 may sense the stylus. In other embodiments, the first sensing electrode 110, the second sensing electrode 120, and the third sensing electrode 130 may also be arrange in another appropriate sequence.

Please refer to FIG. 6. In the present embodiment, the touch apparatus 100 includes the first sensing electrode 110, the second sensing electrode 120, and the third sensing electrode 130, and may further include the protection element (cover lens) 150, an adhesive layer 160, and a first substrate 170. The first substrate 170 is, for example, a glass substrate, but the present invention is not limited thereto. The first sensing electrode 110 and the second sensing electrode 120 may be formed at an upper surface and a lower surface of the first substrate 170 respectively, so as to form a stack structure S1. The third sensing electrode 130 may be formed at a lower surface of the protection element 150, so as to form a stack structure S2. The stack structure S1 and the stack structure S2 may be connected together by using the adhesive layer 160. In the present embodiment, the touch apparatus 100 may further include an adhesive layer 180 and the display module LCM. The stack structure S1 and the stack structure S2 may be attached on the display module LCM by using the adhesive layer 180, so that the touch apparatus 100 further has a display function. In the present embodiment, the protection element 150, the third sensing electrode 130, the adhesive layer 160, the second sensing electrode 120, the first substrate 170, the first sensing electrode 110, the adhesive layer 180 and the display module LCM may be sequentially arranged along the line-of-sight direction z.

It should be noted that manners for configuring the first sensing electrode 110, the second sensing electrode 120, and the third sensing electrode 130 in the touch apparatus 100 shown in FIG. 6 is merely for describing the present invention in examples, but is not intended to limit the present invention. In other embodiments, the first sensing electrode 110, the second sensing electrode 120, and the third sensing electrode 130 may also be stacked in other manners, so as to form a plurality of different types of touch apparatuses. The plurality of different types of touch apparatuses also fall within the protection scope of the present invention. This is described in examples below with reference to FIG. 7 to FIG. 16.

Figure 7:
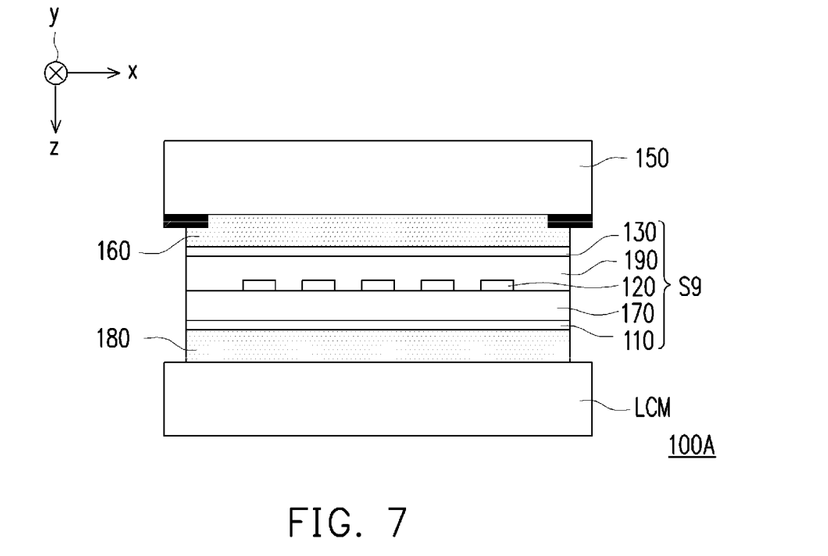
FIG. 7 is a cross-sectional schematic view of a touch apparatus according to another embodiment of the present invention.

FIG. 7 is a cross-sectional schematic view of a touch apparatus according to another embodiment of the present invention. Please refer to FIG. 7. In the present embodiment, a touch apparatus 100A includes the first sensing electrode 110, the second sensing electrode 120, and the third sensing electrode 130, and further includes the protection element 150, the adhesive layer 160, an insulation layer 190, and the first substrate 170. The first sensing electrode 110 is formed at the lower surface of the first substrate 170. The second sensing electrode 120 is formed at the upper surface of the first substrate 170. The insulation layer 190 is formed at the upper surface of the first substrate 170, so as to cover the second sensing electrode 120. The third sensing electrode 130 is formed on the insulation layer 190, so as to be electrically isolated from the second sensing electrode 120. The first sensing electrode 110, the first substrate 170, the second sensing electrode 120, the insulation layer 190, and the third sensing electrode 130 form a stack structure S3. The stack structure S3 may be connected to the protection element 150 by using the adhesive layer 160. In the present embodiment, the touch apparatus 100A may further include the adhesive layer 180 and the display module LCM. The protection element 150, the adhesive layer 160, and the stack structure S3 may be attached on the display module LCM by using the adhesive layer 180, so that the touch apparatus 100A further has a display function. In the present embodiment, the protection element 150, the adhesive layer 160, the third sensing electrode 130, the insulation layer 190, the second sensing electrode 120, the first substrate 170, the first sensing electrode 110, the adhesive layer 180 and the display module LCM may be sequentially arranged along the line-of-sight direction z.

Figure 8:
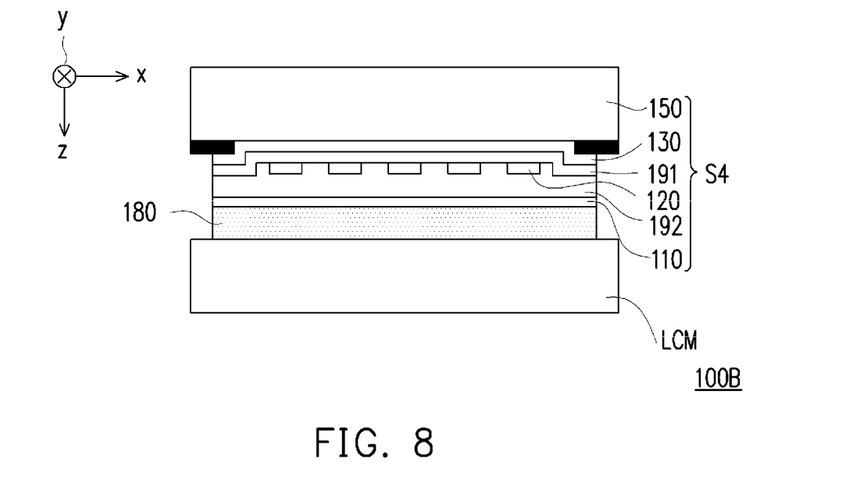
FIG. 8 is a cross-sectional schematic view of a touch apparatus according to still another embodiment of the present invention.

FIG. 8 is a cross-sectional schematic view of a touch apparatus according to still another embodiment of the present invention. Please refer to FIG. 8. In the present embodiment, a touch apparatus 100B includes the first sensing electrode 110, the second sensing electrode 120, and the third sensing electrode 130, and further includes the protection element 150, an insulation layer 191, and an insulation layer 192. The third sensing electrode 130 is formed at the lower surface of the protection element 150. The insulation layer 191 covers the third sensing electrode 130. The second sensing electrode 120 is formed on the insulation layer 191. The insulation layer 192 covers the second sensing electrode 120. The first sensing electrode 110 is formed on the insulation layer 192. The protection element 150, the third sensing electrode 130, the insulation layer 191, the second sensing electrode 120, the insulation layer 192, and the first sensing electrode 110 form a stack structure S4. In the present embodiment, the touch apparatus 100B may further include the adhesive layer 180 and the display module LCM. The stack structure S4 may be attached on the display module LCM by using the adhesive layer 180, so that the touch apparatus 100 further has a display function. In the present embodiment, the protection element 150, the third sensing electrode 130, the insulation layer 191, the second sensing electrode 120, the insulation layer 192, the first sensing electrode 110, the adhesive layer 180 and the display module LCM may be sequentially arranged along the line-of-sight direction z.

Figure 9:
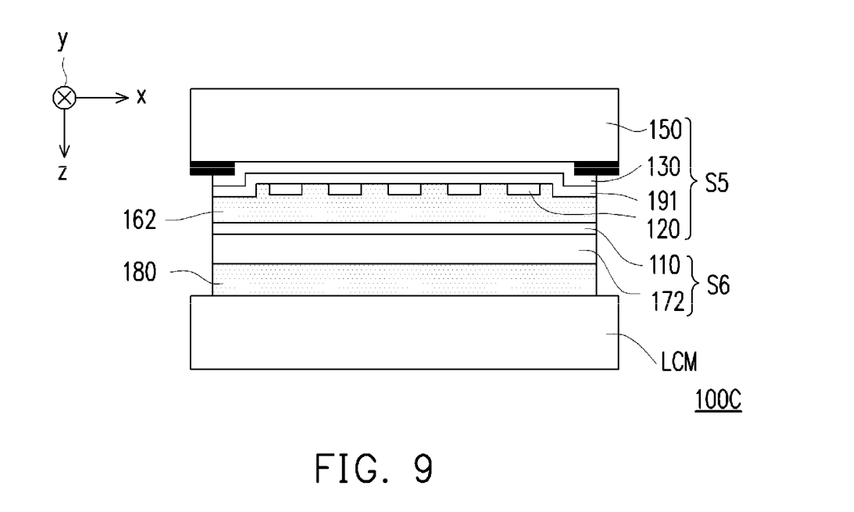
FIG. 9 is a cross-sectional schematic view of a touch apparatus according to yet another embodiment of the present invention.

FIG. 9 is a cross-sectional schematic view of a touch apparatus according to yet another embodiment of the present invention. In the present embodiment, a touch apparatus 100C includes the first sensing electrode 110, the second sensing electrode 120, and the third sensing electrode 130, and further includes the protection element 150, the insulation layer 191, an adhesive layer 162, and a film 172. The third sensing electrode 130 is formed at the lower surface of the protection element 150. The insulation layer 191 covers the third sensing electrode 130. The second sensing electrode 120 is formed on the insulation layer 191. The protection element 150, the third sensing electrode 130, the insulation layer 191, and the second sensing electrode 120 form a stack structure S5. The first sensing electrode 110 is formed at an upper surface of the film 172. The first sensing electrode 110 and the film 172 form a stack structure S6. The stack structure S5 is attached on the stack structure S6 by using the adhesive layer 162. In the present embodiment, the touch apparatus 100C may further include the adhesive layer 180 and the display module LCM. The stack structure S5 and the stack structure S6 are attached on the display module LCM by using the adhesive layer 180, so that the touch apparatus 100C further has a display function. In the present embodiment, the protection element 150, the third sensing electrode 130, the insulation layer 191, the second sensing electrode 120, the adhesive layer 162, the first sensing electrode 110, the film 172, the adhesive layer 180 and the display module LCM may be sequentially arranged along the line-of-sight direction z.

Figure 10:
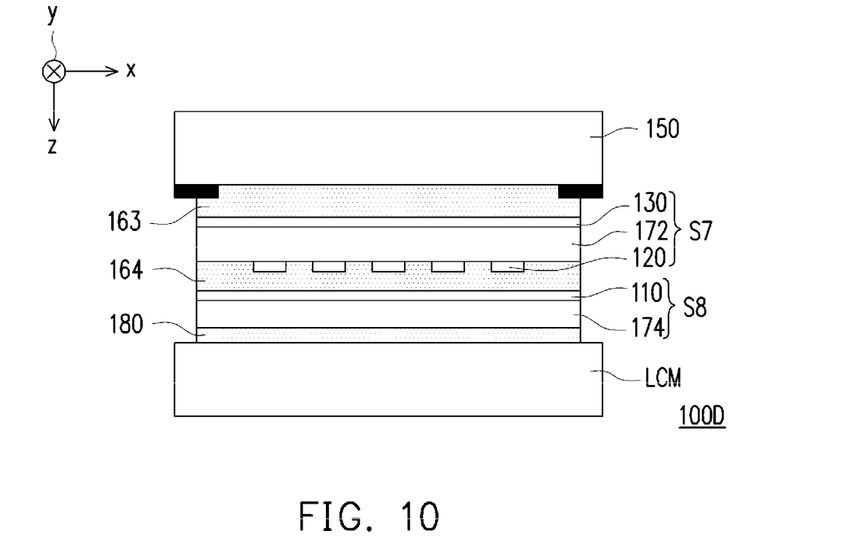
FIG. 10 is a cross-sectional schematic view of a touch apparatus according to an embodiment of the present invention.

FIG. 10 is a cross-sectional schematic view of a touch apparatus according to an embodiment of the present invention. In the present embodiment, a touch apparatus 100D includes the first sensing electrode 110, the second sensing electrode 120, and the third sensing electrode 130, and further includes the protection element 150, an adhesive layer 163, the film 172, an adhesive layer 164, and a film 174. The third sensing electrode 130 is formed at an upper surface of the film 172. The second sensing electrode 120 is formed at a lower surface of the film 172. The third sensing electrode 130, the film 172, and the second sensing electrode 120 form a stack structure S7. The stack structure S7 is attached at the lower surface of the protection element 150 by using the adhesive layer 163. The first sensing electrode 110 is formed at an upper surface of the other film 174. The first sensing electrode 110 and the film 174 form a stack structure S8. The stack structure S7 is attached on the stack structure S8 by using the adhesive layer 164. In the present embodiment, the touch apparatus 100D may further include the adhesive layer 180 and the display module LCM. The protection element 150, the stack structure S7, and the stack structure S8 are attached on the display module LCM by using the adhesive layer 180, so that the touch apparatus 100D further has a display function. In the present embodiment, the protection element 150, the adhesive layer 163, the third sensing electrode 130, the film 172, the second sensing electrode 120, the adhesive layer 164, the first sensing electrode 110, the film 174, the adhesive layer 180 and the display module LCM may be sequentially arranged along the line-of-sight direction z.

Figure 11:
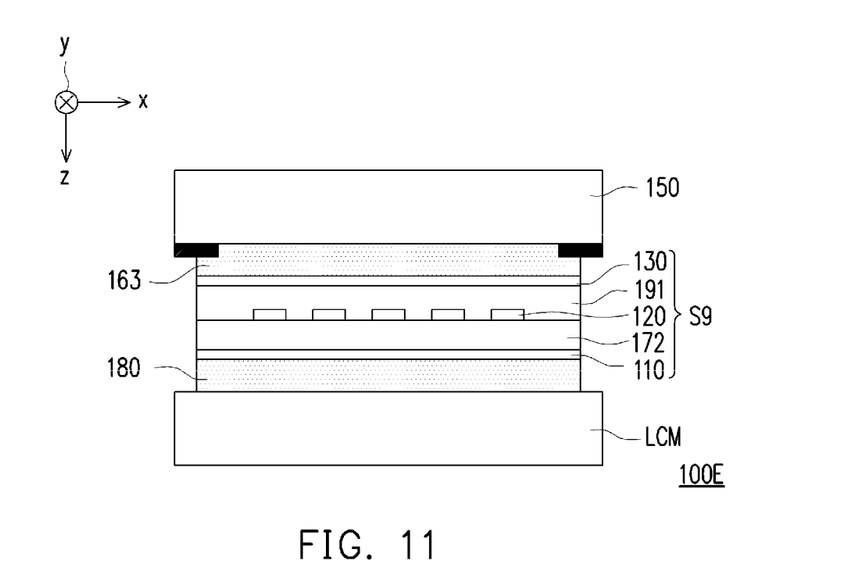
FIG. 11 is a cross-sectional schematic view of a touch apparatus according to another embodiment of the present invention.

FIG. 11 is a cross-sectional schematic view of a touch apparatus according to another embodiment of the present invention. In the present embodiment, a touch apparatus 100E includes the first sensing electrode 110, the second sensing electrode 120, and the third sensing electrode 130, and further includes the protection element 150, the adhesive layer 163, the insulation layer 191, and the film 172. The first sensing electrode 110 is formed at the lower surface of the film 172. The second sensing electrode 120 is formed at the upper surface of the film 172. The insulation layer 191 covers the second sensing electrode 120. The third sensing electrode 130 is formed on the insulation layer 191. The first sensing electrode 110, the film 172, the second sensing electrode 120, the insulation layer 191, and the third sensing electrode 130 form a stack structure S9. The stack structure S9 is attached at the lower surface of the protection element 150 by using the adhesive layer 163. In the present embodiment, the touch apparatus 100E may further include the adhesive layer 180 and the display module LCM. The protection element 150 and the stack structure S9 are attached on the display module LCM by using the adhesive layer 180, so that the touch apparatus 100E further has a display function. In the present embodiment, the protection element 150, the adhesive layer 163, the third sensing electrode 130, the insulation layer 191, the second sensing electrode 120, the film 172, the first sensing electrode 110, the adhesive layer 180 and the display module LCM may be sequentially arranged along the line-of-sight direction z.

Figure 12:
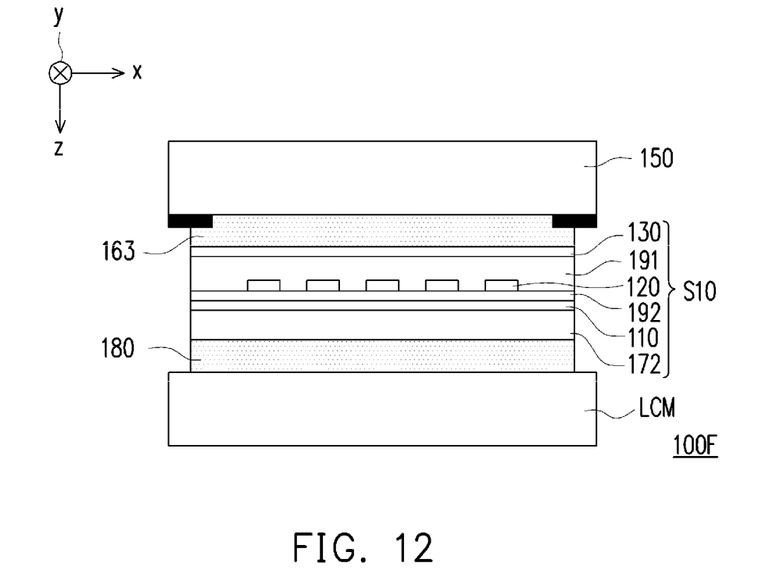
FIG. 12 is a cross-sectional schematic view of a touch apparatus according to still another embodiment of the present invention.

FIG. 12 is a cross-sectional schematic view of a touch apparatus according to still another embodiment of the present invention. In the present embodiment, a touch apparatus 100F includes the first sensing electrode 110, the second sensing electrode 120, and the third sensing electrode 130, and further includes the protection element 150, the adhesive layer 163, the insulation layer 191, the insulation layer 192, and the film 172. The first sensing electrode 110 is formed at the upper surface of the film 172. The insulation layer 192 covers the first sensing electrode 110. The second sensing electrode 120 is formed on the insulation layer 192. The insulation layer 191 covers the second sensing electrode 120. The third sensing electrode 130 is formed on the insulation layer 191. The film 172, the first sensing electrode 110, the insulation layer 192, the second sensing electrode 120, the insulation layer 191, and the third sensing electrode 130 form a stack structure S10. The stack structure S10 is attached at the lower surface of the protection element 150 by using the adhesive layer 163. In the present embodiment, the touch apparatus 100F may further include the adhesive layer 180 and the display module LCM. The protection element 150 and the stack structure S10 are attached on the display module LCM by using the adhesive layer 180, so that the touch apparatus 100F further has a display function. In the present embodiment, the protection element 150, the adhesive layer 163, the third sensing electrode 130, the insulation layer 191, the second sensing electrode 120, the insulation layer 192, the first sensing electrode 110, the film 172, the adhesive layer 180 and the display module LCM may be sequentially arranged along the line-of-sight direction z.

Figure 13:
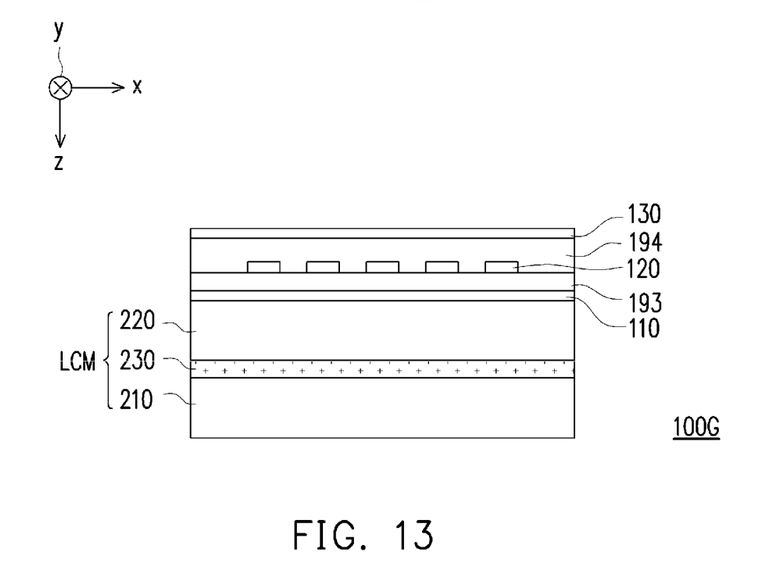
FIG. 13 is a cross-sectional schematic view of a touch apparatus according to yet another embodiment of the present invention.

FIG. 13 is a cross-sectional schematic view of a touch apparatus according to yet another embodiment of the present invention. In the present embodiment, a touch apparatus 100G includes the first sensing electrode 110, the second sensing electrode 120, and the third sensing electrode 130, and further includes the display module LCM, an insulation layer 193, and an insulation layer 194. The display module LCM includes a first substrate 210, a second substrate 220 opposite to the first substrate 210, and a display medium 230 configured between the first substrate 210 and the second substrate 220. The first sensing electrode 110, the second sensing electrode 120, and the third sensing electrode 130 may all be configured on the display module LCM. In detail, the first sensing electrode 110 is formed at an upper surface of the second substrate 220, the insulation layer 193 covers the first sensing electrode 110, the second sensing electrode 120 is formed on the insulation layer 193, the insulation layer 193 covers the second sensing electrode 120, and the third sensing electrode 130 is formed on the insulation layer 194. The third sensing electrode 130, the insulation layer 194, the second sensing electrode 120, the insulation layer 193, the first sensing electrode 110, the second substrate 220, the display medium 230, and the first substrate 210 are sequentially stacked along the line-of-sight direction z.

Figure 14:
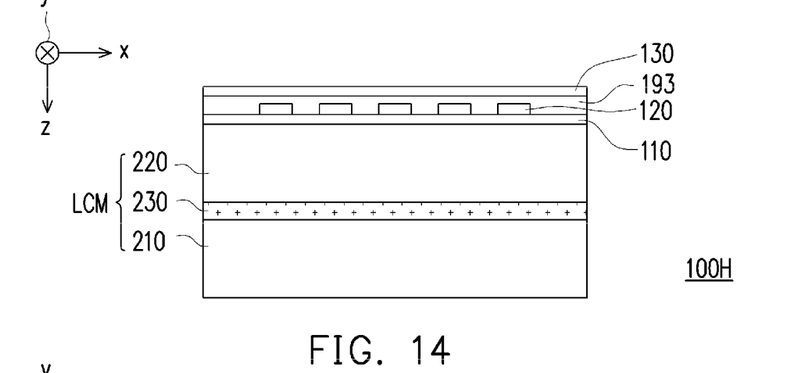
FIG. 14 is a cross-sectional schematic view of a touch apparatus according to an embodiment of the present invention.

FIG. 14 is a cross-sectional schematic view of a touch apparatus according to an embodiment of the present invention. In the present embodiment, a touch apparatus 100H includes the first sensing electrode 110, the second sensing electrode 120, and the third sensing electrode 130, and further includes the display module LCM and the insulation layer 193. The display module LCM includes the first substrate 210, the second substrate 220 opposite to the first substrate 210, and the display medium 230 configured between the first substrate 210 and the second substrate 220. Parts of the first sensing electrode 110, the second sensing electrode 120, and the third sensing electrode 130 may be configured within the display module LCM. Parts of the first sensing electrode 110, the second sensing electrode 120, and the third sensing electrode 130 may be configured outside the display module LCM. For example, in the present embodiment, the first sensing electrode 110 may be configured within the display module LCM, that is, located between the first substrate 210 and the second substrate 220. In detail, the first sensing electrode 110 may be configured between the second substrate 220 and the display medium 230 of the display module LCM. The second sensing electrode 120 may be formed at an upper surface of the second substrate 220. The insulation layer 193 covers the second sensing electrode 120. The third sensing electrode 130 is formed on the insulation layer 193. In the present embodiment, the third sensing electrode 130, the insulation layer 193, the second sensing electrode 120, the second substrate 220, the first sensing electrode 110, the display medium 230, and the first substrate 210 may be sequentially stacked along the line-of-sight direction z. However, the present invention is not limited thereto. In other embodiments, the first sensing electrode 110 may also be configured between the display medium 230 and the first substrate 210; and the third sensing electrode 130, the insulation layer 193, the second sensing electrode 120, the second substrate 220, the display medium 230, the first sensing electrode 110, and the first substrate 210 may be sequentially stacked along the line-of-sight direction z.

Figure 15:
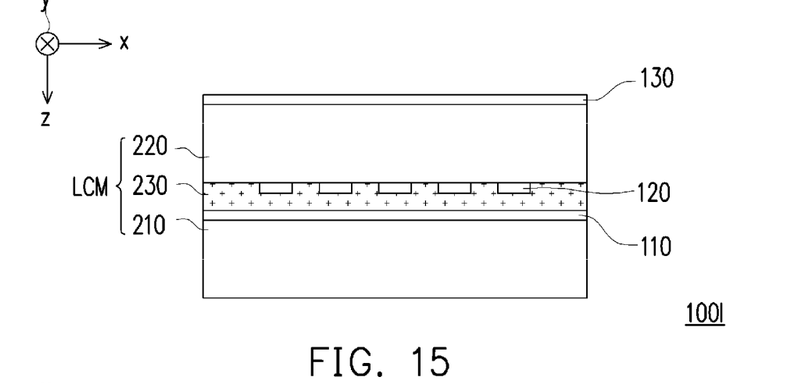
FIG. 15 is a cross-sectional schematic view of a touch apparatus according to another embodiment of the present invention.

FIG. 15 is a cross-sectional schematic view of a touch apparatus according to another embodiment of the present invention. In the present embodiment, a touch apparatus 100I includes the first sensing electrode 110, the second sensing electrode 120, and the third sensing electrode 130, and further includes the display module LCM. The display module LCM includes the first substrate 210, the second substrate 220 opposite to the first substrate 210, and the display medium 230 configured between the first substrate 210 and the second substrate 220. In the present embodiment, the first sensing electrode 110 and the second sensing electrode 120 may be configured within the display module LCM, that is, located between the first substrate 210 and the second substrate 220. The third sensing electrode 130 may be configured outside the display module LCM. For example, the first sensing electrode 110 may be configured on the first substrate 210 of the display module LCM, and located between the display medium 230 and the first substrate 110. The second sensing electrode 120 may be configured on the second substrate 220, and located between the second substrate 220 and the display medium 230. The third sensing electrode 130 may be configured at the upper surface of the second substrate 220. In the present embodiment, the third sensing electrode 130, the second substrate 220, the second sensing electrode 120, the display medium 230, the first sensing electrode 110, and the first substrate 210 may be sequentially stacked along the line-of-sight direction z. However, the present invention is not limited thereto. In still another embodiment, the third sensing electrode 130, the second substrate 220, the second sensing electrode 120, the first sensing electrode 110, the display medium 230 and the first substrate 210 may be sequentially stacked along the line-of-sight direction z; and in yet another embodiment, the third sensing electrode 130, the second substrate 220, the display medium 230, the second sensing electrode 120, the first sensing electrode 110 and the first substrate 210 may be sequentially stacked along the line-of-sight direction z.

Figure 16:
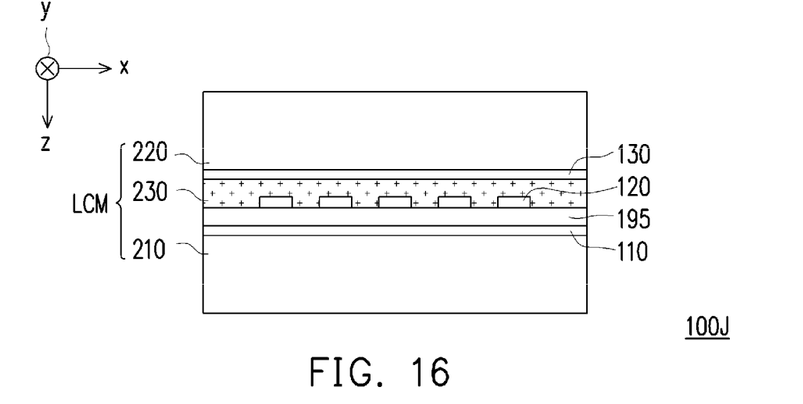
FIG. 16 is a cross-sectional schematic view of a touch apparatus according to still another embodiment of the present invention.

FIG. 16 is a cross-sectional schematic view of a touch apparatus according to still another embodiment of the present invention. In the present embodiment, a touch apparatus 100J includes the first sensing electrode 110, the second sensing electrode 120, and the third sensing electrode 130, and further includes the display module LCM and an insulation layer 195. The display module LCM includes the first substrate 210, the second substrate 220 opposite to the first substrate 210, and the display medium 230 configured between the first substrate 210 and the second substrate 220. In the present embodiment, the first sensing electrode 110, the second sensing electrode 120, and the third sensing electrode 130 may all be configured within the display module LCM. For example, the first sensing electrode 110 may be configured on the first substrate 210 of the display module LCM; the insulation layer 195 covers the first sensing electrode 110; and the second sensing electrode 120 is formed on the insulation layer 195. The second sensing electrode 120, the insulation layer 195, and the first sensing electrode 110 may be located between the display medium 230 and the first substrate 210. The third sensing electrode 130 may be configured on the second substrate 220 of the display module LCM, and located between the second substrate 220 and the display medium 230. In the present embodiment, the second substrate 220, the third sensing electrode 130, the display medium 230, the second sensing electrode 120, the insulation layer 195, the first sensing electrode 110 and the first substrate 210 may be sequentially stacked along the line-of-sight direction z. However, the present invention is not limited thereto.

Any one of the foregoing touch apparatuses 100A-100J may sense, by using a sensing method same to that of the touch apparatus 100, a touch position of a finger and a touch position of a stylus. In addition, any one of the foregoing touch apparatuses 100A-100J may also be used to sense a degree of inclination of the stylus, and details are not described herein again.

Please refer to FIG. 1. In the present embodiment, each of the third sensing electrodes 130 partially overlaps a corresponding first sensing electrode 110. In other words, each of the third sensing electrodes 130 does not totally cover the corresponding first sensing electrode 110. In this way, although the third sensing electrode 130 is closer to a user as compared with the first sensing electrode 110 and the second sensing electrode 120, configuration of the third sensing electrode 130 also would not excessively affect finger-sensing capacities of the first sensing electrode 110 and the second sensing electrode 120. In the present embodiment, the third sensing electrode 130 may be located within the first sensing electrode 110. However, the present invention is not limited thereto. In other embodiments, the third sensing electrode 130 and the first sensing electrode 110 may also be configured in other appropriate manners; this is described below using FIG. 17 to FIG. 21 as examples.

Figure 17:
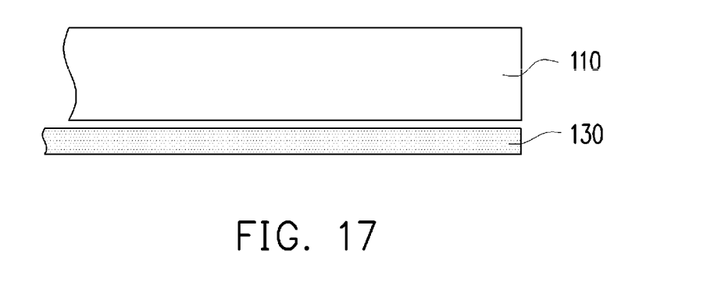
FIG. 17 shows a corresponding first sensing electrode and third sensing electrode according to another embodiment of the present invention.
Figure 18:
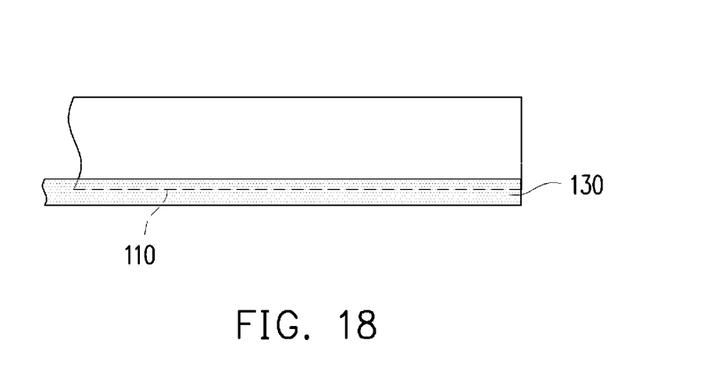
FIG. 18 shows a corresponding first sensing electrode and third sensing electrode according to still another embodiment of the present invention.
Figure 19:
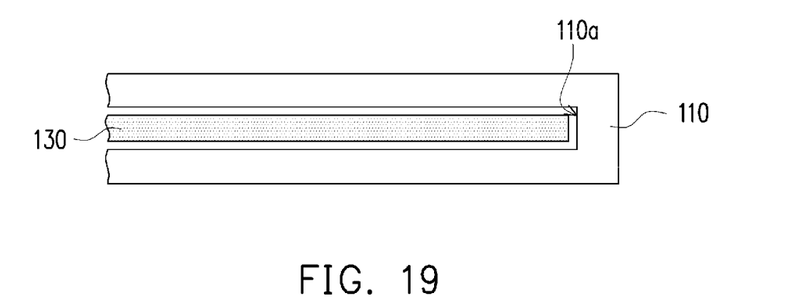
FIG. 19 shows a corresponding first sensing electrode and third sensing electrode according to yet another embodiment of the present invention.
Figure 20:
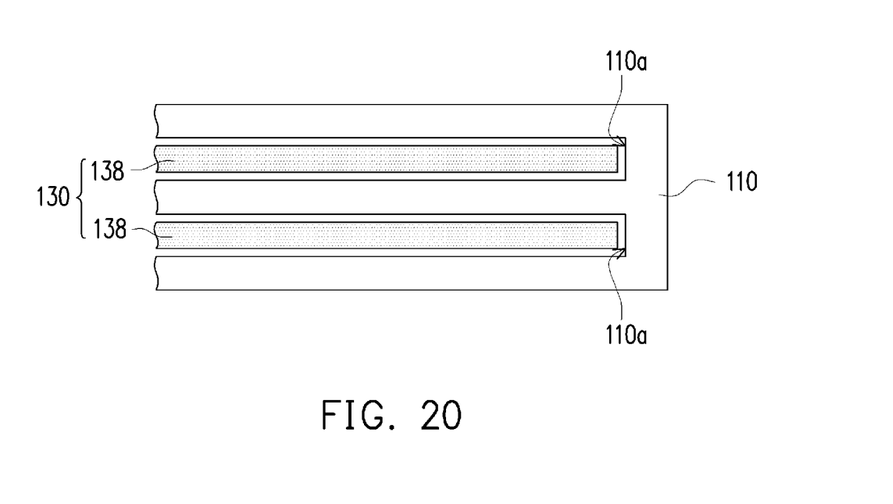
FIG. 20 shows a corresponding first sensing electrode and third sensing electrode according to an embodiment of the present invention.

FIG. 17 shows a corresponding first sensing electrode and third sensing electrode according to another embodiment of the present invention. In an embodiment of FIG. 17, the third sensing electrode 130 may also partially overlap the first sensing electrode 110 and exceed the first sensing electrode 110. FIG. 18 shows a corresponding first sensing electrode and third sensing electrode according to still another embodiment of the present invention. In an embodiment of FIG. 18, the third sensing electrode 130 may be located beside the first sensing electrode 110. In other words, the third sensing electrode 130 may be staggered from the first sensing electrode 110 and does not overlap the same. FIG. 19 shows a corresponding first sensing electrode and third sensing electrode according to yet another embodiment of the present invention. In an embodiment of FIG. 19, the first sensing electrode 110 has an opening 110a; and an orthographic projection of a third sensing electrode 130 corresponding to the first sensing electrode 110 on a surface at which the first sensing electrode 110 is located may be located within the opening 110a. FIG. 20 shows a corresponding first sensing electrode and third sensing electrode according to an embodiment of the present invention. In an embodiment of FIG. 20, the first sensing electrode 110 has a plurality of openings 110a; a third sensing electrode 130 corresponding to the first sensing electrode 110 may have a plurality of branch portions 138; and orthographic projections of the plurality of branch portions 138 on the surface at which the first sensing electrode 110 is located may be located within the plurality of openings 110a respectively.

Figure 21:
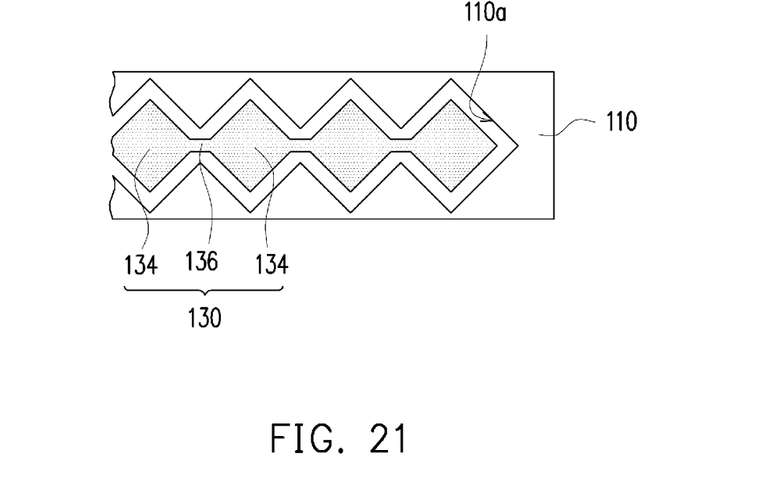
FIG. 21 shows a corresponding first sensing electrode and third sensing electrode according to another embodiment of the present invention.

In addition, in the embodiments of FIG. 17 to FIG. 20, a shape of the third sensing electrode 130 uses a stripe as examples, and a shape of the first sensing electrode 110 uses a strip-shaped pattern or a plurality of strip-shaped patterns connected with each other as examples. However, the present invention is not limited thereto. In other embodiments, the third sensing electrode 130 and the first sensing electrode 110 may also represent other appropriate shapes; this is described below using FIG. 21 as an example. FIG. 21 shows a corresponding first sensing electrode and third sensing electrode according to another embodiment of the present invention. In an embodiment of FIG. 21, the third sensing electrode 130 may include a plurality of rhombic patterns 134 and a plurality of bridge lines 136, where each of bridge lines 136 is connected to adjacent two rhombic patterns 134, and the opening 110a of the first sensing electrode 110 may have a jagged edge corresponding to the plurality of rhombic patterns 134. The first sensing electrode 110 and the third sensing electrode 130 of any one of FIG. 17 to FIG. 21 may be applied to any one of the foregoing touch apparatus 100, 100A, 100B, 100C, 100D, 100E, 100F, 100G, 100H, 100I, or 100J.

Based on the above, the touch apparatus according to an embodiment of the present invention includes a plurality of first sensing electrodes extending along a first direction, a plurality of second sensing electrodes extending along a second direction, and a plurality of third sensing electrodes extending along the first direction and electrically isolated from the second sensing electrodes. Efficiency for the touch apparatus to sense a finger and/or a stylus may be improved by using the third sensing electrodes outside the first sensing electrodes and the second sensing electrodes.

Although the present invention discloses the foregoing by using the embodiments, the foregoing is not intended to limit the present invention. Any person of ordinary skill in the art may make some variations and modifications without departing from the scope and spirit of the invention. Therefore, the protection scope of the present invention should fall within the scope defined by the appended claims below.

What is claimed is:

1. A touch apparatus, comprising:
a plurality of first sensing electrodes, extending along a first direction;
a plurality of second sensing electrodes, electrically isolated from the first sensing electrodes, and extending along a second direction different from the first direction;
a plurality of third sensing electrodes, electrically isolated from the second sensing electrodes, and extending along the first direction, wherein the first sensing electrodes, the second sensing electrodes, and the third sensing electrodes are formed at different plurality of film layers respectively, wherein the third sensing electrodes, the second sensing electrodes and the first sensing electrodes are sequentially arranged along a line-of-sight direction of an user of the touch apparatus vertical to the first direction and the second direction, and the third sensing electrode is closer to the user as compared with the first sensing electrode and the second sensing electrode;
a capacitive stylus, pre-loading a voltage at a pen point of the capacitive stylus and outputting an electric field; and
a control unit, electrically connected to the first sensing electrodes, the second sensing electrodes, and the third sensing electrodes, wherein the control unit determines a touch position of a finger according to signals on the first sensing electrodes and the second sensing electrodes, and determines a touch position of the capacitive stylus according to signals of the electric field received on the second sensing electrodes and the third sensing electrodes.

2. The touch apparatus according to claim 1, wherein within a first subframe time, the control unit reads the signals on the second sensing electrodes and the third sensing electrodes at the same time, so as to determine the touch position of the capacitive stylus; and within a second subframe time successive to the first subframe time, the control unit drives the first sensing electrodes and reads signals on the second sensing electrodes, so as to determine the touch position of the finger.

3. The touch apparatus according to claim 1, wherein within a first subframe time, the control unit respectively reads signals on the second sensing electrodes and signals on the third sensing electrodes, and determines the touch position of the capacitive stylus according to the signals on the second sensing electrodes and the signals on the third sensing electrodes which are read within the first subframe time; and within the first subframe time and a second subframe time successive to the first subframe time, the control unit drives the first sensing electrodes and reads signals on the second sensing electrodes, so as to determine the touch position of the finger.

4. The touch apparatus according to claim 1, wherein the control unit reads signals on the first sensing electrodes and signals on the third sensing electrodes at the same time, so as to obtain a first signal difference;
the control unit reads the signals on the first sensing electrodes and the signals on the third sensing electrodes at the same time, so as to obtain a second signal difference; and
the control unit compares the first signal difference and the second signal difference, so as to determine an orientation of the capacitive stylus.

5. The touch apparatus according to claim 1, further comprising:
a protection element;
an adhesive layer; and
a first substrate, wherein the protection element, the third sensing electrodes, the adhesive layer, the second sensing electrodes, the first substrate and the first sensing electrodes are sequentially arranged along a line-of-sight direction.

6. The touch apparatus according to claim 1, further comprising:
a protection element;
an adhesive layer;
an insulation layer; and
a first substrate, wherein the protection element, the adhesive layer, the third sensing electrodes, the insulation layer, the second sensing electrodes, the first substrate and the first sensing electrodes are sequentially stacked along a line-of-sight direction.

7. The touch apparatus according to claim 1, further comprising:
a protection element; and
an insulation layer, wherein the protection element, the third sensing electrodes, the insulation layer, the second sensing electrodes and the first sensing electrodes are sequentially stacked along a line-of-sight direction.

8. The touch apparatus according to claim 1, further comprising:
a protection element;
an insulation layer;
an adhesive layer; and
a film, wherein the protection element, the third sensing electrodes, the insulation layer, the second sensing electrodes, the adhesive layer, the first sensing electrodes and the film are sequentially stacked along a line-of-sight direction.

9. The touch apparatus according to claim 1, further comprising:

a protection element;
a first adhesive layer;
a first film;
a second adhesive layer; and
a second film, wherein the protection element, the first adhesive layer, the third sensing electrodes, the first film, the second sensing electrodes, the second adhesive layer, the first sensing electrodes and the second film are sequentially stacked along a line-of-sight direction.

10. The touch apparatus according to claim 1, further comprising:
a protection element;
an adhesive layer;
an insulation layer; and
a film, wherein the protection element, the adhesive layer, the third sensing electrodes, the insulation layer, the second sensing electrodes, the film and the first sensing electrodes are sequentially stacked along a line-of-sight direction.

11. The touch apparatus according to claim 1, further comprising:
a protection element;
an adhesive layer; and
a film, wherein the protection element, the adhesive layer, the third sensing electrodes, the second sensing electrodes, the first sensing electrodes and the film are sequentially stacked along a line-of-sight direction.

12. The touch apparatus according to claim 1, further comprising:
a first substrate;
a second substrate, opposite to the first substrate; and
a display medium, configured between the first substrate and the second substrate, wherein the third sensing electrodes, the second sensing electrodes, the first sensing electrodes, the second substrate, the display medium and the first substrate are sequentially stacked along a line-of-sight direction.

13. The touch apparatus according to claim 1, further comprising:
a first substrate;
a second substrate, opposite to the first substrate; and
a display medium, configured between the first substrate and the second substrate, wherein the third sensing electrodes, the second sensing electrodes, the second substrate, the display medium and the first substrate are sequentially stacked along a line-of-sight direction, and the first sensing electrodes are located between the first substrate and the second substrate.

14. The touch apparatus according to claim 1, further comprising:
a first substrate;
a second substrate, opposite to the first substrate; and
a display medium, configured between the first substrate and the second substrate, wherein the third sensing electrodes, the second substrate, the second sensing electrodes, the first sensing electrodes and the first substrate are sequentially stacked along a line-of-sight direction.

15. The touch apparatus according to claim 1, further comprising:
a first substrate;
a second substrate, opposite to the first substrate; and
a display medium, configured between the first substrate and the second substrate, wherein the second substrate, the display medium and the first substrate are sequentially stacked along a line-of-sight direction, and the first sensing electrodes, the second sensing electrodes, and the third sensing electrodes are located between the first substrate and the second substrate.

16. The touch apparatus according to claim 1, wherein each of the third sensing electrodes partially overlaps a corresponding first sensing electrode.

17. The touch apparatus according to claim 1, wherein each of the third sensing electrodes is staggered from a corresponding first sensing electrode and does not overlap the corresponding first sensing electrode.

* * * * *